United States Patent
Kerr et al.

(10) Patent No.: US 11,844,170 B2
(45) Date of Patent: Dec. 12, 2023

(54) HEATER USING MICROWAVE ENERGY

(71) Applicants: Gary R. Kerr, Covina, CA (US);
Perry Tollett, Indian Wells, CA (US)

(72) Inventors: Gary R. Kerr, Covina, CA (US);
Perry Tollett, Indian Wells, CA (US)

(*) Notice: Subject to any disclaimer, the term of this patent is extended or adjusted under 35 U.S.C. 154(b) by 0 days.

(21) Appl. No.: 17/723,453

(22) Filed: Apr. 18, 2022

(65) Prior Publication Data

US 2022/0353961 A1    Nov. 3, 2022

Related U.S. Application Data

(60) Provisional application No. 63/176,335, filed on Apr. 18, 2021, provisional application No. 63/298,877, filed on Jan. 12, 2022.

(51) Int. Cl.
| | |
|---|---|
| *H05B 6/64* | (2006.01) |
| *H05B 6/74* | (2006.01) |
| *B60H 1/22* | (2006.01) |
| *F24H 3/00* | (2022.01) |

(52) U.S. Cl.
CPC ......... *H05B 6/6491* (2013.01); *B60H 1/2221* (2013.01); *F24H 3/004* (2013.01); *H05B 6/6402* (2013.01); *H05B 6/642* (2013.01); *F24H 2250/12* (2013.01)

(58) Field of Classification Search
CPC .... H05B 6/6491; H05B 6/6402; H05B 6/642; B60H 1/2221; F24H 3/004
USPC ....... 219/759, 756, 760, 761, 757, 725, 729, 219/730, 735, 739, 740
See application file for complete search history.

(56) References Cited

U.S. PATENT DOCUMENTS

2002/0153370 A1* 10/2002 Stutman ................. B60N 3/16
219/715

FOREIGN PATENT DOCUMENTS

| CN | 204153961 U | * | 2/2015 |
| JP | S61272526 A | * | 12/1986 |
| JP | WO 20160311737 A1 | * | 3/2016 |
| KR | 1020100010394 A | * | 2/2010 |

OTHER PUBLICATIONS

Translation of KR1020100010394A, "Microwave Oven", LG Electronic Inc., 2010, by ProQuest (Year: 2010).*

* cited by examiner

*Primary Examiner* — Quang T Van
(74) *Attorney, Agent, or Firm* — Hoang Steve Ngo

(57) ABSTRACT

The present invention is a heater or heating device that uses microwave energy to generate heat quickly. The heater generates heat quickly by forcing air over microwave-heated oil or non-freeze liquid. As a non-limiting embodiment, the heater preferably includes most or all of the following components: an outer casing or housing, at least one air intake vent, a magnetron, a microwave emitter, a wave scatterer, at least one fluid holder, fluid, a capacitor, a transformer, a microwave containment casing, and a perforated microwave guard. As another non-limiting embodiment, the heater preferably includes most or all of following components: an outer casing or housing, a cooling fan, a magnetron, a microwave emitter, a wave scatterer, at least one non-freeze liquid holder, non-freeze liquid, a capacitor, a transformer, a microwave containment casing, a glass tube, a metal tube, a fan coil, a pump, a reservoir and expansion tank, and a fill plug.

20 Claims, 4 Drawing Sheets

HEATER USING MICROWAVE ENERGY

CROSS-REFERENCE TO RELATED APPLICATIONS

The present application claims the priority benefit of both U.S. Provisional Patent Application Ser. No. 63/176,335, filed on Apr. 18, 2021, and U.S. Provisional Patent Application Ser. No. 63/298,877, filed on Jan. 12, 2022, which are incorporated herein by reference in their entireties.

BACKGROUND OF THE INVENTION

Field of the Invention

The present invention generally relates to heaters, heating systems, heating apparatuses, and heating devices. More specifically, the present invention is a heater or heating device that uses microwave energy to generate heat quickly. The heater generates heat quickly by forcing air over microwave-heated oil or non-freeze liquid.

Description of the Related Art

Heaters, heating systems, heating apparatuses, and heating devices are known in the art.

The present invention overcomes one or more of the shortcomings of heaters, heating systems, heating apparatuses, and heating devices. The Applicants are unaware of inventions or patent documents, taken either singly or in combination, which are seen to describe the present invention as claimed.

One advantage of the heater or heating device of the present invention is being able to generate heat quickly.

Another advantage of the heater or heating device of the present invention is that it solves the issue with heaters that emit gasses or have exposed heating wires.

A further advantage of the heater or heating device of the present invention is that the heater itself can be relatively small and/or compact and used throughout certain homes, building structures, or vehicles where space is limited.

An additional advantage of the heater or heating device of the present invention is that the heater uses a generally smaller or lesser amount of electricity than other types of electric heaters.

SUMMARY OF THE PRESENT INVENTION

The present invention is a heater or heating device that uses microwave energy to generate heat quickly. The heater generates heat quickly by forcing air over microwave-heated oil or non-freeze liquid.

As a non-limiting embodiment of the present invention, the heater preferably includes most or all of the following components: an outer casing or housing, at least one air intake vent, a magnetron, a microwave emitter, a wave scatterer, at least one fluid holder, fluid, a capacitor, a transformer, a microwave containment casing, a shield or diffuser, and a perforated microwave guard.

As another non-limiting embodiment of the present invention, the heater preferably includes most or all of the following components: an outer casing or housing, a cooling fan, a magnetron, a microwave emitter, a wave scatterer, at least one non-freeze liquid holder, non-freeze liquid, a capacitor, a transformer, a microwave containment casing, shield or diffuser, glass tube, metal tube, a fan coil, a pump, a reservoir and expansion tank, and a fill plug. In addition, the heater may also include controls preferably consisting of but not limited to the following: switches for temperature and fan control, a circuit board, a transformer, a thermostat, a thermister, one or more relays, temperature sensors, safety sensors, visual lighted indicators, and all necessary wiring.

It should be understood that the above-attached figures are not intended to limit the scope of the present invention in any way.

DETAILED DESCRIPTION OF THE EMBODIMENTS OF THE PRESENT INVENTION

As shown in FIGS. 1-4, the present invention is a heater or heating device 100,400 that uses microwave energy to generate heat quickly. The heater 100,400 generates heat quickly by forcing air over microwave-heated oil or non-freeze liquid, respectively. The heater 100,400 uses a standard process used by available or traditional microwave ovens that are used or being used by consumers. In general, these microwave ovens are an electric oven that heats and cooks foods and/or fluids by exposing it to electromagnetic radiation in the microwave frequency range. This induces polar molecules in the foods and/or fluids to rotate and produce thermal energy in a process known as dielectric heating. Microwave ovens heat foods and/or fluids quickly and efficiently because excitation is fairly uniform in the outer 25-38 mm (1-1.5 inches) of a homogeneous, high liquid item. Microwave ovens can be used to heat oil and non-freeze liquid and can attain far higher temperatures than that of boiling water.

Figure 1:
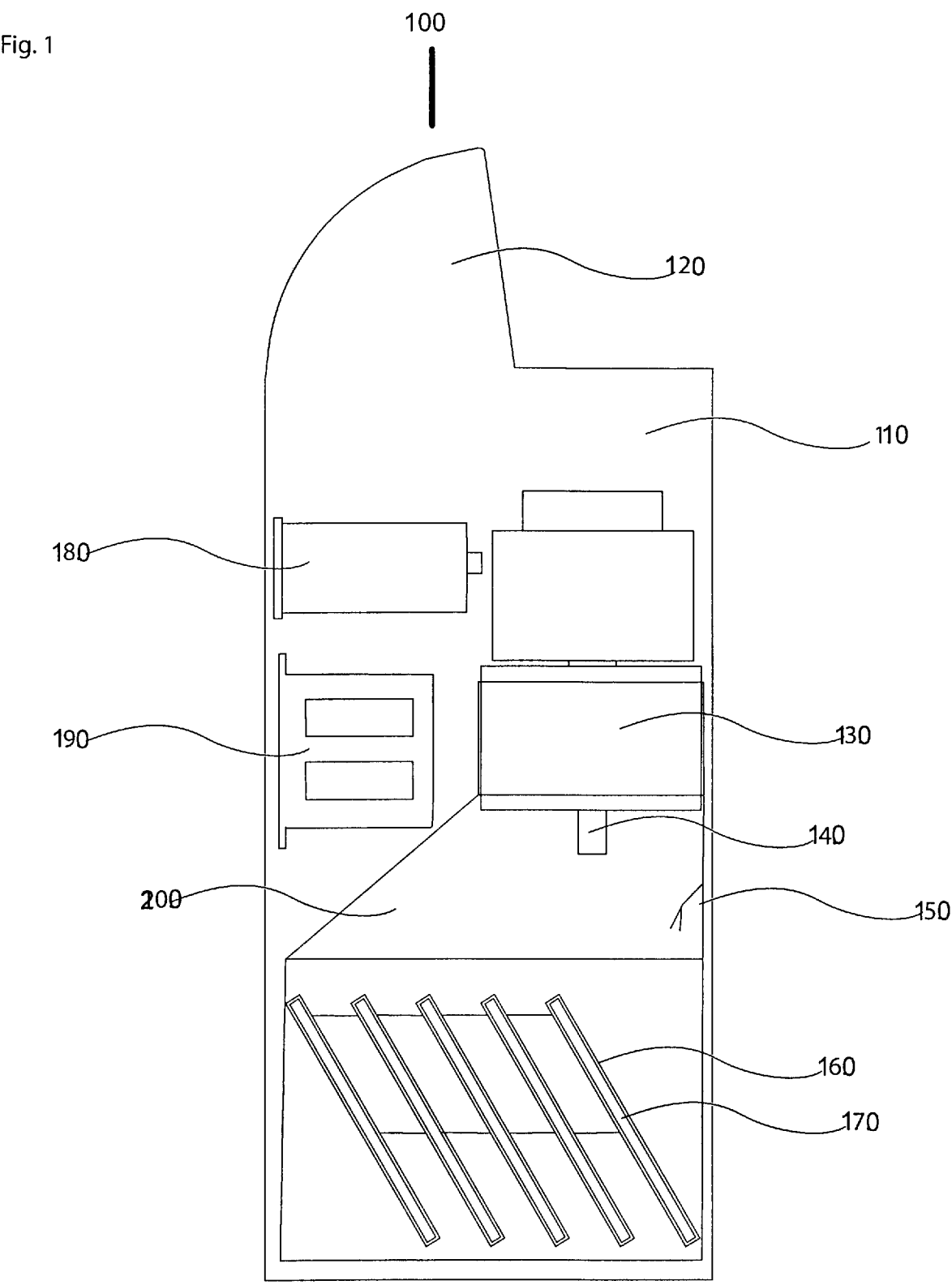
FIG. 1 is a right side view of an embodiment of a heater according to the present invention.
Figure 2:
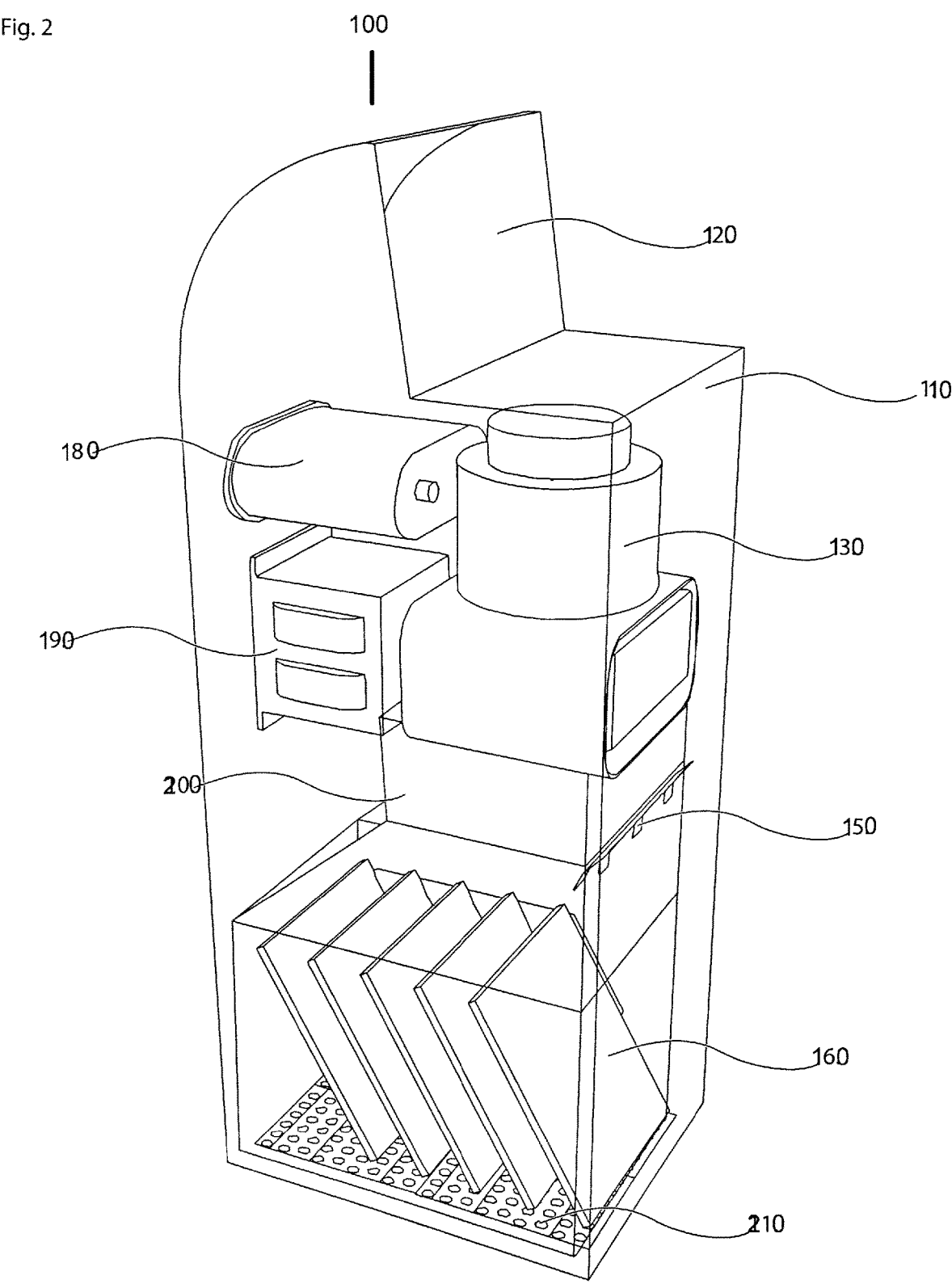
FIG. 2 is a front, right side, perspective view of the heater of FIG. 1.
Figure 3:
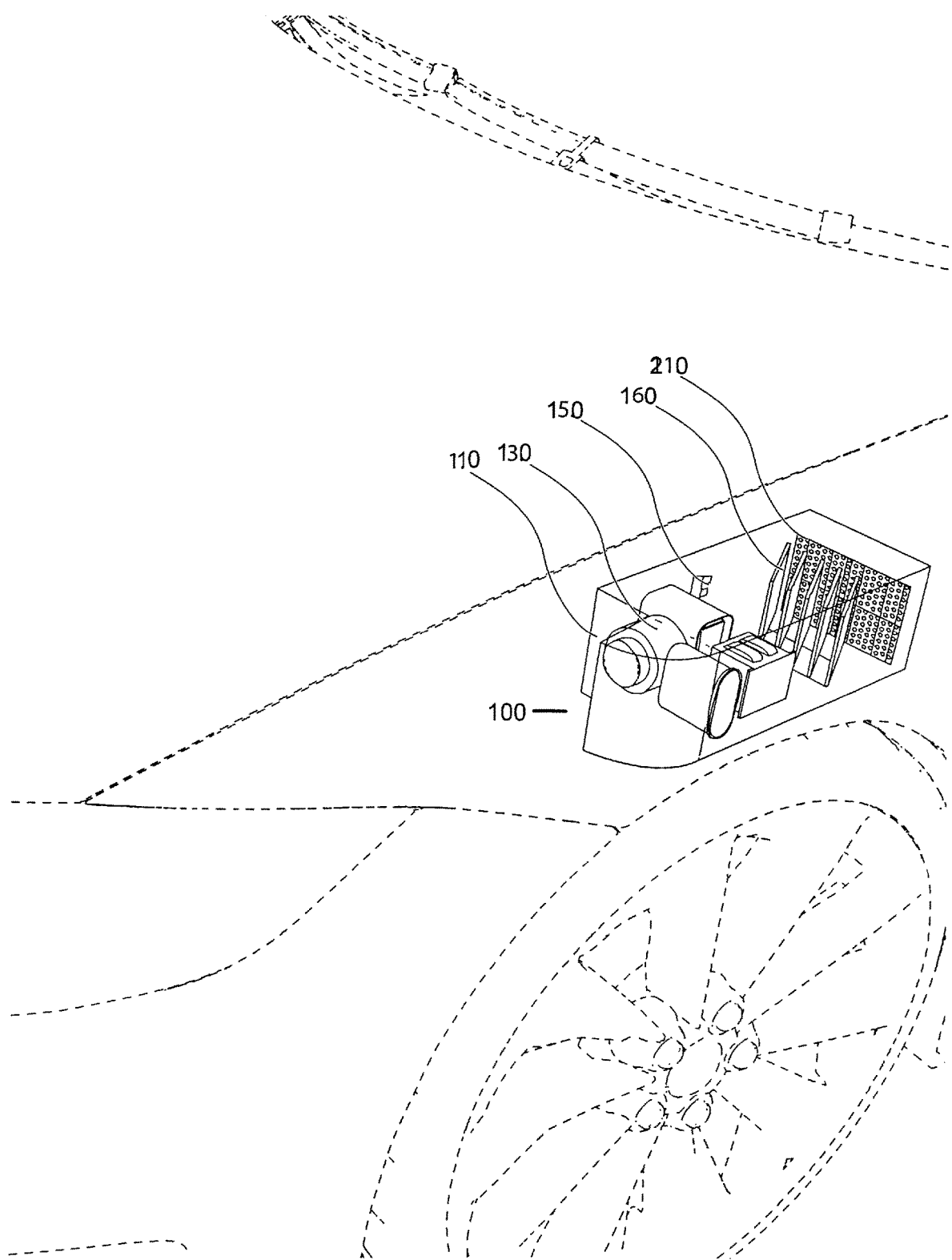
FIG. 3 is an environmental, perspective view of the heater of FIG. 1.

As shown in FIGS. 1-3 and as a non-limiting embodiment of the present invention, the heater 100 preferably includes most or all of the following components: an outer casing or housing 110, at least one air intake vent 120, a magnetron 130, a microwave emitter 140, a wave scatterer 150, at least one fluid holder 160, fluid 170, a capacitor 180, a transformer 190, a microwave containment casing 200, and a perforated microwave guard 210.

The outer casing or housing 110 is dimensioned and configured for housing the other components of the heater 100. Preferably, outer casing or housing 110 is made or manufactured of a metal material, aluminum, a plastic material, a wood material, any material known to one of ordinary skill in the art (OOSA), or any combination thereof.

Each of the at least one air intake vent 120 is dimensioned and configured for drawing in air from its surroundings.

The magnetron 130 is preferably contained in a metal duct and is capable of emitting a beam at several fluid holders 160 that are filled with fluid 170, such as, but not limited to, oil. As the fluid heats up, air is brought across them from outside the device 100 or outer casing or housing 110. The heated air is then directed where needed.

The microwave emitter 140 may be any applicable microwave emitter known to OOSA.

The wave scatterer 150 may be any applicable wave scatterer known to OOSA.

As a non-limiting example, the fluid holders 160 are thin, flat plates having a certain thickness. The thickness of the plates 160 can be about a half inch (½") or any other preferred or applicable thickness. Preferably, the plates 160 are made or manufactured of a ceramic material, a plastic material, a glass material, or any combination thereof.

The oil 170 may be any applicable oil known to OOSA.

The capacitor 180 may be any applicable capacitor known to OOSA.

The transformer 190 may be any applicable transformer known to OOSA.

The microwave containment casing, shield or diffuser 200 is dimensioned and configured for housing the fluid holders 160 and oil 170. Preferably, the microwave containment casing, shield or diffuser 200 is made or manufactured of a metal material, aluminum, a plastic material, or any combination thereof. Preferably, the microwave containment casing, shield or diffuser 200 is made or manufactured of a fire-retardant or fire-proof material.

The perforated microwave guard 210 may be any applicable microwave guard known to OOSA.

As a non-limiting example, the heater or heating device 100 can be dimensioned and configured to be relatively small and/or compact and used throughout certain homes, building structures, or vehicles where space is limited. As shown in FIG. 3, the heater 100 may be positioned at a preferred or applicable location within a vehicle.

Figure 4:
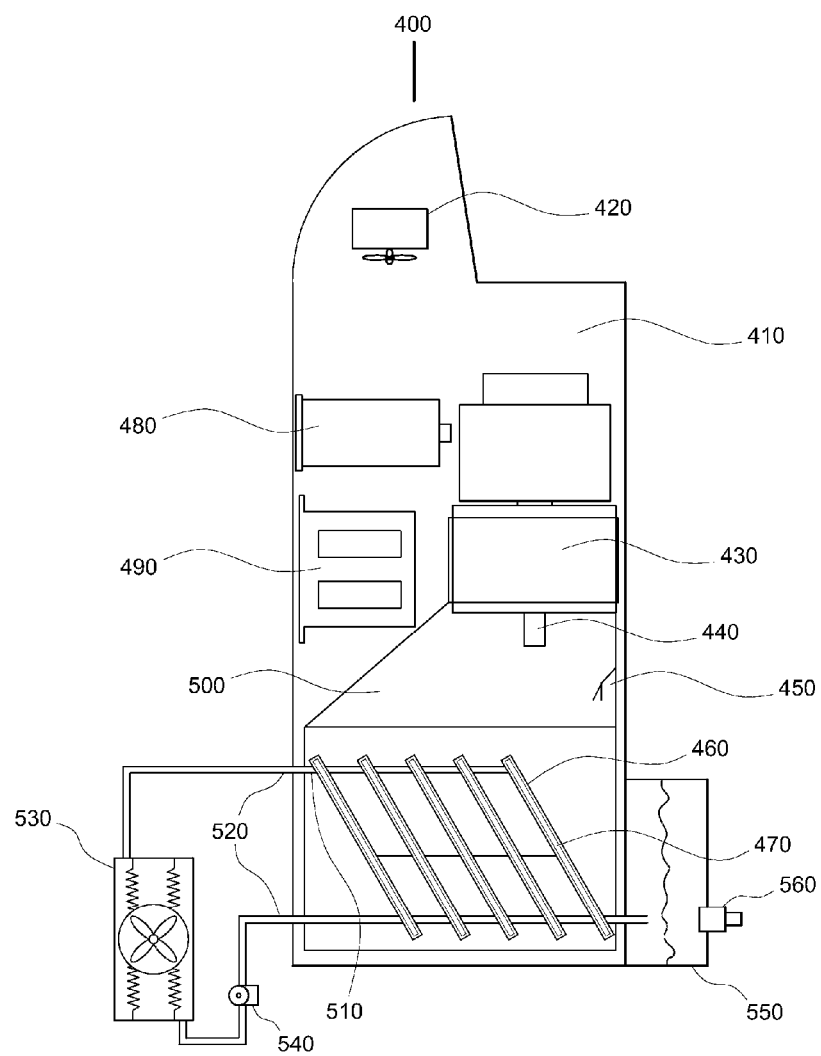
FIG. 4 is a right side view of another embodiment of a heater according to the present invention.

As shown in FIG. 4 and as another non-limiting embodiment of the present invention, the heater 400 preferably includes most or all of the following components: an outer casing or housing 410, a cooling fan 420, a magnetron 430, a microwave emitter 440, a wave scatterer 450, at least one non-freeze liquid holder 460, non-freeze liquid 470, a capacitor 480, a transformer 490, a microwave containment casing, a shield or diffuser 500, a glass tube 510, a metal tube 520, a fan coil 530, a pump 540, a reservoir and expansion tank 550, and a fill plug 560.

The outer casing or housing 410 is dimensioned and configured for housing the other components of the heater 400. Preferably, outer casing or housing 410 is made or manufactured of a metal material, aluminum, a plastic material, a wood material, or any combination thereof.

The cooling fan 420 is capable of cooling the magnetron 430, capacitor 480, a transformer 490, and other components. It also can be used to disperse the resulting heat that is generated to appropriate areas.

The magnetron 430 is preferably contained in a metal duct and is capable of emitting a beam at several oil holders 460 that are filled with fluid. As the fluid heats up, air is brought across them from outside the device 400 or outer casing or housing 410. The heated air is then directed where needed. Preferably, magnetron 430 is subtantially or exactly the same as magnetron 130.

The microwave emitter 440 may be any applicable microwave emitter known to OOSA. Preferably, microwave emitter 440 is subtantially or exactly the same as microwave emitter 140.

The wave scatterer 450 may be any applicable wave scatterer known to OOSA. Preferably, wave scatterer 450 is subtantially or exactly the same as wave scatterer 150.

As a non-limiting example, the non-freeze liquid holders 460 are thin, flat plates having a certain thickness. The thickness of the plates 460 can be about a half inch (½") or any other preferred or applicable thickness. Preferably, the plates 460 are made or manufactured of a ceramic material, a plastic material, a glass material, or any combination thereof. More preferably, the plates 460 are made or manufactured of a high temperature variety or type.

The non-freeze liquid 470 may be any applicable non-freeze liquid known to OOSA.

The capacitor 480 may be any applicable capacitor known to OOSA. Preferably, capacitor 480 is subtantially or exactly the same as capacitor 180.

The transformer 490 may be any applicable transformer known to OOSA. Preferably, transformer 490 is subtantially or exactly the same as transformer 190.

The microwave containment casing, shield or diffuser 500 is dimensioned and configured for housing the non-freeze liquid holders 460 and non-freeze liquid 470. Preferably, the microwave containment casing, shield or diffuser 500 is made or manufactured of a metal material, aluminum, a plastic material, or any combination thereof. Preferably, the microwave containment casing, shield or diffuser 500 is made or manufactured of a fire-retardant or fire-proof material. Preferably, microwave containment casing, shield or diffuser 500 is subtantially or exactly the same as microwave containment casing, shield or diffuser 200.

The glass tube 510 may be any applicable glass tube known to OOSA, and is made or manufactured of a glass material.

The metal tube 520 may be any applicable metal tube known to OOSA, and is made or manufactured of a metal material.

The fan coil 530 may be any applicable fan coil known to OOSA.

The pump 540 may be any applicable pump known to OOSA. The pump 540 is used for circulating the fluid thru the heat exchanger plates or fins 460 so as to reduce extreme "spot" heat at the plates or fins 460 caused by the magnetron 430. The pump 540 may also be used to distribute heat to areas outside the microwave containment casing 500 where it can be used for a variety of applications such as but not limited to warming electric vehicle batteries, fan coils or de-icing applications.

The reservoir and expansion tank 550 may be any applicable reservoir and expansion tank known to OOSA.

The fill plug 560 may be any applicable fill plug known to OOSA.

As a non-limiting example, the heater or heating device 400 can be dimensioned and configured to be relatively small and/or compact and used throughout certain homes, building structures, or vehicles where space is limited. It can also be of sufficient size to heat large areas such as an entire home. As similarly shown in FIG. 3, the heater 400 may be positioned at a preferred or applicable location within a vehicle.

It is to be understood that the present invention is not limited to the embodiments described above or as shown in the attached figures, but encompasses any and all embodiments within the spirit of the invention.

The invention claimed is:

1. A heater using microwave energy for generating heated air to warm a nearby surrounding, said heater comprising:
    an outer housing;
    at least one air intake vent dimensioned and configured for drawing in air from the nearby surrounding;
    a capacitor;
    a transformer;
    a microwave containment casing dimensioned and configured for housing at least one fluid holder;
    said at least one fluid holder, wherein said at least one fluid holder is dimensioned and configured for retaining a fluid capable of being heated up; and a magnetron comprising a microwave emitter, wherein, when activated, said microwave emitter emits microwave energy directed at said at least one fluid holder such that the fluid and said at least one fluid holder heat up whereby heated air is generated when air is drawn through said at least one air intake vent and passes over said at least one fluid holder, and wherein the generated heated air is capable of exiting said heater to warm the nearby surrounding.

2. The heater according to claim 1, wherein said at least one fluid holder is at least one plate.

3. The heater according to claim 2, wherein at least one plate of said at least one plate has a thickness of about a half inch.

4. The heater according to claim 2, wherein said at least one plate is made or manufactured of a material selected from the group consisting of a ceramic material, a plastic material, a glass material, and any combination thereof.

5. The heater according to claim 1, wherein said outer housing is made or manufactured of a metal material, aluminum, a plastic material, a wood material, any material known to one of ordinary skill in the art, or any combination thereof.

6. The heater according to claim 1, wherein said magnetron is contained in a metal duct.

7. The heater according to claim 1, wherein said microwave containment casing is made or manufactured of a material selected from the group consisting of a metal material, aluminum, a plastic material, and any combination thereof.

8. The heater according to claim 1, wherein said microwave containment casing is made or manufactured of a fire-retardant or fire-proof material.

9. The heater according to claim 1, wherein said heater is secured for use in a vehicle.

10. The heater according to claim 1, wherein said at least one fluid holder comprises a fluid capable of being heated up.

11. The heater according to claim 1, wherein said at least one fluid holder is a plurality of thin, flat plates.

12. The heater according to claim 1, wherein said heater is dimensioned and configured to be a small device or a compact device.

13. The heater according to claim 1, wherein said heater is dimensioned and configured for use in homes and building structures.

14. The heater according to claim 1, wherein said heater is dimensioned and configured for use in homes and building structures where space is limited.

15. A heater using microwave energy for generating heated air to warm a nearby surrounding, said heater comprising:

an outer housing;

at least one air intake vent dimensioned and configured for drawing in air from the nearby surrounding;

a wave scatterer;

a capacitor;

a transformer;

a perforated microwave guard;

said at least one fluid holder, wherein said at least one fluid holder is dimensioned and configured for retaining a fluid capable of being heated up; and a magnetron comprising a microwave emitter, wherein, when activated, said microwave emitter emits microwave energy directed at said at least one fluid holder such that the fluid and said at least one fluid holder heat up whereby heated air is generated when air is drawn through said at least one air intake vent and passes over said at least one fluid holder, wherein the generated heated air is capable of exiting said heater to warm the nearby surrounding.

16. The heater according to claim 15, wherein said at least one fluid holder is a plurality of thin, flat plates.

17. The heater according to claim 15, wherein said heater is dimensioned and configured to be a small device or a compact device.

18. The heater according to claim 15, wherein said heater is dimensioned and configured for use in homes and building structures.

19. The heater according to claim 15, wherein said heater is dimensioned and configured for use in homes and building structures where space is limited.

20. The heater according to claim 15, further comprising a microwave containment casing dimensioned and configured for housing said at least one fluid holder.

\* \* \* \* \*